United States Patent
Zaman et al.

(10) Patent No.: US 11,950,096 B2
(45) Date of Patent: Apr. 2, 2024

(54) USING A CLIENT DEVICE FOR PROVIDING EXTRA LEVEL OF SECURITY FOR CRITICAL PARAMETERS

(71) Applicant: ARRIS Enterprises LLC, Suwanee, GA (US)

(72) Inventors: Akhtar Ghaus Zaman, Bangalore (IN); Muralidharan Narayanan, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 213 days.

(21) Appl. No.: 17/469,261

(22) Filed: Sep. 8, 2021

(65) Prior Publication Data

US 2022/0141659 A1 May 5, 2022

Related U.S. Application Data

(60) Provisional application No. 63/109,039, filed on Nov. 3, 2020.

(51) Int. Cl.
*H04L 29/06* (2006.01)
*H04W 12/06* (2021.01)

(52) U.S. Cl.
CPC ................... *H04W 12/068* (2021.01)

(58) Field of Classification Search
CPC . H04L 63/0838; H04L 63/067; H04L 9/0863; H04L 9/3228; H04W 12/068
See application file for complete search history.

(56) References Cited

U.S. PATENT DOCUMENTS

| | | | |
|---|---|---|---|
| 7,668,944 B2 * | 2/2010 | Leib | H04L 41/0226 370/257 |
| 2020/0045519 A1 * | 2/2020 | Raleigh | H04M 15/765 |

* cited by examiner

*Primary Examiner* — Joseph P Hirl
*Assistant Examiner* — Chi D Nguy
(74) *Attorney, Agent, or Firm* — Wenderoth, Lind & Ponack, L.L.P.

(57) ABSTRACT

Aspects of the present disclosure are drawn to client device for use with a network controller and an external server, the network controller being configured to manage a wireless network, to change a critical parameter of the wireless network, to transmit a request for a one time password (OTP). The external server being configured to generate the OTP in response to the request for the OTP, to provide a notification of the OTP and to transmit the OTP to the network controller. The network controller being configured to additionally receive the OTP from the external server. The client device including a memory having a data structure stored therein, the data structure including a list of configurable critical parameters of the wireless network, and including a processor configured to execute instructions stored on the memory to cause the client device to receive a request to configure a configurable parameter of the wireless network. The client device also determines whether the configurable parameter of the wireless network matches a configurable critical parameter of the wireless network within the list of configurable critical parameters of the wireless network. The client device further transmits, when the configurable parameter of the wireless network matches a configurable critical parameter of the wireless network within the list of configurable critical parameters of the wireless network, the request for the OTP. The client device may also receive the notification of the OTP from the external server and access the OTP based on the notification and may transmit the OTP to the network controller.

9 Claims, 6 Drawing Sheets

| | Gateway Device | Primary Client Device | Critical Parameter(s) | Contact Information |
|---|---|---|---|---|
| 510 | Gateway A | User 1 | Changing Parental Controls | user1@email.com |
| 512 | | | Guest SSID Password | (XXX)-XXX-XXXX |
| 514 | | | Reboot Gateway Device | user1backup@email.com |
| 516 | Gateway B | User 2 | Guest SSID Password | (XXX)-XXX-XXXX |
| 518 | | | Change Guest SSID | user2@email.com |
| 520 | Gateway C | User 3 | Reboot Gateway Device | (XXX)-XXX-XXXX |
| 522 | | | Editing Time Rules | SMS |
| 524 | | | Disabling Guest SSID | user3@email.com |

| | Gateway Device | Primary Client Device | Critical Parameter(s) | Contact Information |
|---|---|---|---|---|
| 510 | Gateway A | User 1 | Changing Parental Controls | user1@email.com |
| 512 | | | Guest SSID Password | (XXX)-XXX-XXXX |
| 514 | | | Reboot Gateway Device | user1backup@email.com |
| 516 | Gateway B | User 2 | Guest SSID Password | (XXX)-XXX-XXXX |
| 518 | | | Change Guest SSID | user2@email.com |
| 520 | Gateway C | User 3 | Reboot Gateway Device | (XXX)-XXX-XXXX |
| 522 | | | Editing Time Rules | SMS |
| 524 | | | Disabling Guest SSID | user3@email.com |

FIG. 5

USING A CLIENT DEVICE FOR PROVIDING EXTRA LEVEL OF SECURITY FOR CRITICAL PARAMETERS

BACKGROUND

Embodiments of the present disclosure generally relate to configuring network devices.

SUMMARY

Aspects of the present disclosure are drawn to client device for use with a network controller and an external server, the network controller being configured to manage a wireless network, to change a critical parameter of the wireless network, to transmit a request for a one time password (OTP). The external server being configured to generate the OTP in response to the request for the OTP, to provide a notification of the OTP and to transmit the OTP to the network controller. The network controller being configured to additionally receive the OTP from the external server. The client device including a memory having a data structure stored therein, the data structure including a list of configurable critical parameters of the wireless network. The client device also including a processor configured to execute instructions stored on the memory to cause the client device to receive a request to configure a configurable parameter of the wireless network. The client device may also determine whether the configurable parameter of the wireless network matches a configurable critical parameter of the wireless network within the list of configurable critical parameters of the wireless network. The client device may further transmit, when the configurable parameter of the wireless network matches a configurable critical parameter of the wireless network within the list of configurable critical parameters of the wireless network, the request for the OTP. The client device may also receive the notification of the OTP from the external server and access the OTP based on the notification. Further, the client device may transmit the OTP to the network controller.

Other aspects of the present disclosure are drawn to a method of using a client device with a network controller and an external server, the network controller being configured to manage a wireless network, to change a critical parameter of the wireless network, and to transmit a request for an OTP. The external server being configured to generate the OTP in response to the request for the OTP, to provide a notification of the OTP and to transmit the OTP to the network controller. The network controller being configured to additionally receive the OTP from the external server, the method including storing, into a memory, a data structure including a list of configurable critical parameters of the wireless network. Also, receiving, via a processor configured to execute instructions stored on the memory, a request to configure a configurable parameter of the wireless network and determining, via the processor, whether the configurable parameter of the wireless network matches a configurable critical parameter of the wireless network within the list of configurable critical parameters of the wireless network. Further, transmitting, via the processor and when the configurable parameter of the wireless network matches a configurable critical parameter of the wireless network within the list of configurable critical parameters of the wireless network, the request for the OTP and receiving, via the processor, the notification of the OTP from the external server. Also, accessing, accessing, via the processor, the OTP based on the notification, and transmitting, via the processor, the OTP to the network controller.

Other aspects of the present disclosure are drawn to a non-transitory, computer-readable media having computer-readable instructions stored thereon, the computer-readable instructions being capable of being read by a client device for use with a network controller and an external server. The network controller being configured to manage a wireless network, to change a critical parameter of the wireless network, to transmit a request for an OTP. The external server being configured to generate the OTP in response to the request for the OTP, to provide a notification of the OTP and to transmit the OTP to the network controller. The network controller may be configured to additionally receive the OTP from the external server, wherein the computer-readable instructions are capable of instructing the client device to perform the method including storing, into a memory, a data structure including a list of configurable critical parameters of the wireless network. The method also including receiving, via a processor configured to execute instructions stored on the memory, a request to configure a configurable parameter of the wireless network and determining, via the processor, whether the configurable parameter of the wireless network matches a configurable critical parameter of the wireless network within the list of configurable critical parameters of the wireless network. The method further including transmitting, via the processor and when the configurable parameter of the wireless network matches a configurable critical parameter of the wireless network within the list of configurable critical parameters of the wireless network, the request for the OTP and receiving, via the processor, the notification of the OTP from the external server. The method also including accessing, via the processor, the OTP based on the notification and transmitting, via the processor, the OTP to the network controller.

Other aspects of the present disclosure are drawn to an external server for use with a first client device, a second client device, and a network controller. The network controller being configured to manage a wireless network, to change a critical parameter of the wireless network, the external server including a memory having a data structure stored therein, the data structure including a list of configurable critical parameters of the wireless network. The external server also including processor configured to execute instructions stored on the memory to cause the external server to receive, from the second client device, a request to configure a configurable parameter of the wireless network. The external server may also determine whether the configurable parameter of the wireless network matches a configurable critical parameter of the wireless network within the list of configurable critical parameters of the wireless network and transmit, when the configurable parameter of the wireless network matches a configurable critical parameter of the wireless network within the list of configurable critical parameters of the wireless network, an OTP to the first client device. The external server may further receive the OTP from the first client device and configure the configurable parameter of the wireless network.

Other aspects of the present disclosure are drawn to a method of using an external server with a first client device, a second client device, and a network controller. The network controller being configured to manage a wireless network, to change a critical parameter of the wireless network, the method including storing, into a memory, a data structure including a list of configurable critical parameters of the wireless network. The method further including receiving, via a processor configured to execute instructions stored on the memory and from the second client device, a request to configure a configurable parameter of the wireless network and determining, via the processor, whether the configurable parameter of the wireless network matches a configurable critical parameter of the wireless network within the list of configurable critical parameters of the wireless network. The method also including transmitting, via the processor and when the configurable parameter of the wireless network matches a configurable critical parameter of the wireless network within the list of configurable critical parameters of the wireless network, an OTP to the first client device. The method further including receiving, via the processor, the OTP from the first client device and configuring, via the processor, the configurable parameter of the wireless network.

Other aspects of the present disclosure are drawn to a non-transitory, computer-readable media having computer-readable instructions stored thereon, the computer-readable instructions being capable of being read by an external server for use with a first client device, a second client device, and a network controller. The network controller may be configured to manage a wireless network, to change a critical parameter of the wireless network, wherein the computer-readable instructions are capable of instructing the external server to perform the method including storing, into a memory, a data structure including a list of configurable critical parameters of the wireless network. The method further including receiving, via a processor configured to execute instructions stored on the memory and from the second client device, a request to configure a configurable parameter of the wireless network and determining, via the processor, whether the configurable parameter of the wireless network matches a configurable critical parameter of the wireless network within the list of configurable critical parameters of the wireless network. The method also including transmitting, via the processor and when the configurable parameter of the wireless network matches a configurable critical parameter of the wireless network within the list of configurable critical parameters of the wireless network, an OTP to the first client device. The method further including receiving, via the processor, the OTP from the first client device and configuring, via the processor, the configurable parameter of the wireless network.

Other aspects of the present disclosure are drawn to a network controller for use with an external server, a first client device, and a second client device. The external server being configured to generate an OTP in response to a request for the OTP, to provide a notification of the OTP and to transmit the OTP to the network controller. The network controller including a memory having a data structure stored therein, the data structure including a list of configurable critical parameters of the wireless network. The network controller further including a processor configured to execute instructions stored on the memory to cause the network controller to receive, from the second client device, a request to configure a configurable parameter of the wireless network and determine whether the configurable parameter of the wireless network matches a configurable critical parameter of the wireless network within the list of configurable critical parameters of the wireless network. The network controller may also transmit, when the configurable parameter of the wireless network matches a configurable critical parameter of the wireless network within the list of configurable critical parameters of the wireless network, the request for the OTP to the external server. The network controller may further receive the OTP from the external server, receive the OTP from the first client device, and transmit a verification to the external server.

Other aspects of the present disclosure are drawn to a method of using a network controller with an external server, a first client device, and a second client device. The external server being configured to generate an OTP in response to a request for the OTP, to provide a notification of the OTP and to transmit the OTP to the network controller. The method including storing, into a memory, a data structure including a list of configurable critical parameters of the wireless network and receiving, via a processor configured to execute instructions stored on the memory and from the second client device, a request to configure a configurable parameter of the wireless network. The method further including determining, via the processor, whether the configurable parameter of the wireless network matches a configurable critical parameter of the wireless network within the list of configurable critical parameters of the wireless network and transmitting, via the processor and when the configurable parameter of the wireless network matches a configurable critical parameter of the wireless network within the list of configurable critical parameters of the wireless network, the request for the OTP to the external server. The method also including receiving, via the processor, the OTP from the external server, receiving, via the processor, the OTP from the first client device, and transmitting, via the processor, a verification to the external server.

Other aspects of the present disclosure are drawn to a non-transitory, computer-readable media having computer-readable instructions stored thereon, the computer-readable instructions being capable of being read by a network controller with an external server, a first client device, and a second client device. The external server being configured to generate an OTP in response to a request for the OTP, to provide a notification of the OTP and to transmit the OTP to the network controller, wherein the computer-readable instructions are capable of instructing the network controller to perform the method including storing, into a memory, a data structure including a list of configurable critical parameters of the wireless network. The method further including receiving, via a processor configured to execute instructions stored on the memory and from the second client device, a request to configure a configurable parameter of the wireless network and determining, via the processor, whether the configurable parameter of the wireless network matches a configurable critical parameter of the wireless network within the list of configurable critical parameters of the wireless network. The method also including transmitting, via the processor and when the configurable parameter of the wireless network matches a configurable critical parameter of the wireless network within the list of configurable critical parameters of the wireless network, the request for the OTP to the external server. The method further including receiving, via the processor, the OTP from the external server, receiving, via the processor, the OTP from the first client device, and transmitting, via the processor, a verification to the external server.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 1 illustrates a conventional communication system onboarding a gateway device at a time to;

FIG. 5 illustrates a non-limiting example for a lookup table (LUT) at a time $t_3$, in accordance with aspects of the present disclosure.

DETAILED DESCRIPTION

In a conventional system and method for configuring network devices, a gateway device and client device are used to manage the home network. The gateway device requires the user to setup the gateway device with the private home network and physically place the gateway device in the right location in the home for optimized network performance. After onboarding the gateway device, the client device may instruct the gateway device to reconfigure aspects of the network, non-limiting examples of aspects that may be reconfigured include creating and supporting a guest network, creating and enabling parental control profiles, and effectively controlling devices that are connected to the home network. The client device is the single control center for managing all functionality of the gateway device including onboarding, parental control, guest SSID, etc. All of the control and management is done by using only one level of authentication of users.

Figure 1:
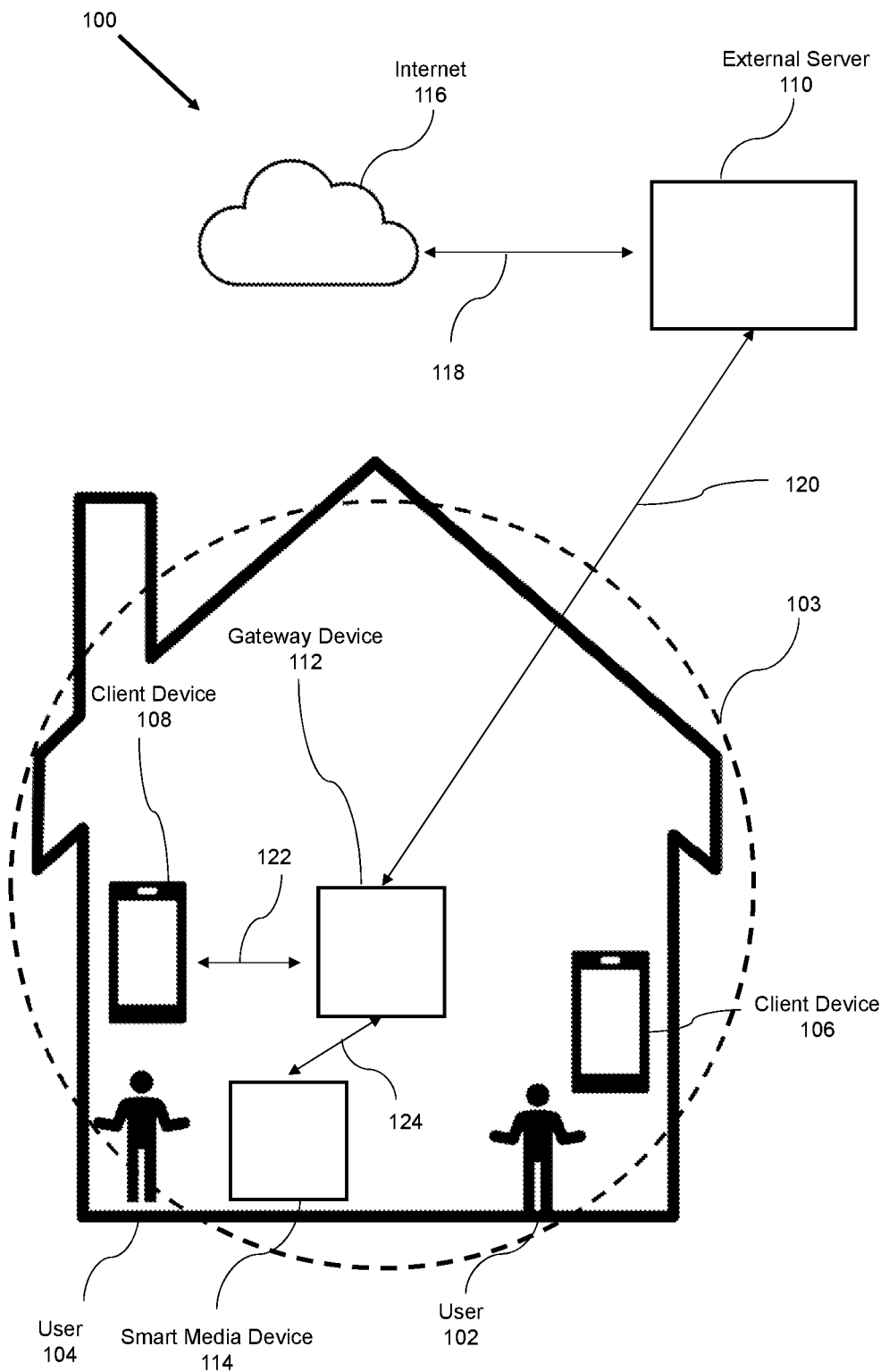

FIG. 1 illustrates a conventional communication system 100 onboarding a gateway device at a time to.

As shown in the figure, communication system 100 includes a user 102, a wireless network 103, a user 104, a client device 106, a client device 108, an external server 110, a gateway device 112, a smart media device 114, Internet 116, a communication channel 118, a communication channel 120, a communication channel 122, and a communication channel 124.

As shown in the figure, client device 108 is configured to communicate with gateway device 112 via communication channel 122. Through gateway device 112 client device 108 is able to communicate with external server 110 via communication channel 120. External server 110 is able to communicate with Internet 116 via communication channel 118. Smart media device 114 is configured to communicate with gateway device 112 via communication channel 124. Smart media device 114 is able to communicate with external server 110 through gateway device 112 via communication channel 120. Smart media device 114 is also able to communicate with internet 116 through external server 110 via communication channel 118.

Gateway device 112 is configured to communicate with internet 116 by way of physical media/wiring, allowing gateway device 112 to then be connected to internet 116 via external server 110.

As illustrated in FIG. 1, gateway device 112, also referred to as a gateway, residential gateway, or RG, is an electronic device that is to be located so as to establish a local area network (LAN) at a consumer premises, an example of which shown as wireless network 103. The consumer premises can include a residential dwelling, office, or any other business space of a user. The terms home, office and premises may be used synonymously herein.

Gateway device 112 may be any device or system that is operable to allow data to flow from one discrete network to another, which as will be described in greater detail below, will be from a wireless local area network (WLAN) to an external network, e.g., the Internet. Gateway device 112 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 112 establishes, or is part of a WLAN, using Wi-Fi for example, such that client device 108 is able to communicate wirelessly with gateway device 112. The term Wi-Fi as used herein may be considered to refer to any of Wi-Fi 4, 5, 6, 6E, or any variation thereof.

Further, it should be noted that gateway device 112 is able to communicate with internet 116 via physical media/wiring, allowing gateway device 112 to then be connected to internet 116 via external server 110. This may optionally be a wireless communication system, such as 4G or 5G, and further is able to connect to the external network, e.g., the Internet, via a service provider.

Within the WLAN, electronic devices are often referred to as being stations in the network. In IEEE 802.11 (Wi-Fi) terminology, a station (abbreviated as STA) is a device that has the capability to use the 802.11 protocol. For example, a station may be a laptop, a desktop PC, PDA, APD or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: A logical entity that is a singly addressable instance of a medium access control (MAC) and physical layer (PHY) interface to the wireless medium (WM).

Consider the following situation: user 104, which in this example is a child of user 102, wishes to access a critical parameter, for example changing a time rule related to a profile in parental controls. User 104 obtains access to the device of user, client device 108, and attempts to access the critical parameter. User 104 knows the password and inputs it into client device 108, allowing user 104 to change the time rule in parental controls without knowledge (and probably approval of) user 102. With this single level of authentication, there is a large threat to security.

A client device may support control and management of all functions of a gateway device including onboarding, parental controls, guest SSID, etc. All control and management is done using only one level of authentication of users. This poses a threat to security as there are certain vulnerable network endpoints in the overall system.

One such vulnerable network endpoint is the client device, as the client device is the main point of interaction with the gateway device for the end user. The client device has all the controlling features included as well. These controlling features oversee sensitive information that is vulnerable to either inadvertent changes or to maliciously intended changes. This may include editing time constraints related to a profile in parental controls, a subnet/DHCP range change, static IP assigned to some devices, or device priority changes within the wireless network.

Another vulnerable network endpoint is a smart media device. The client device does support controlling of some features through a smart media device such as enabling or disabling a guest SSID, spelling out a SSID password, rebooting the gateway device, or a malicious user could use the smart media device to receive details of the guest SSID.

An additional vulnerable network endpoint is the external server. In the external server, there are controls that are available, making it possible that the user may inadvertently change some settings in the external server that could affect the wireless network as well as device management. If the credentials for the external server are divulged then it is possible for maliciously intended changes to be attempted. In some other cases, the service providers may make changes to the user account and the user may want to be informed of these changes.

An extra level of security may be needed for certain critical parameters of the network that may be reconfigured by the gateway device. For example, there may be a need for security around the usage of controlling parental control rules, device priority assignment, subnet change, smart media device voice commands, etc. There are a couple of cases that may potentially need some extra security within the client device. Once a client device is connected to the gateway device and is accessing content, the only way to block the client device is by using the profile in the parental control feature. The profile may include multiple client devices or include only a particular targeted client device. Once the parental control profile is set, there is no specific password to control the parental control feature. Given this situation, anyone who has access to the parent's client device can freely modify the parental control settings, and these changes may be applied and go un-noticed by the parents. If the user has a smart media device linked to the gateway device, which is another way to control the gateway device, any guest user can ask for a guest SSID password. The smart media device may respond with the password, unless the voice profile is set in the smart media device. Another security concern is that the client device also supports the setting of device priority (for higher bandwidth usage), and if a malicious user gets control of the authorized client device, the user can change these settings as well.

What is needed is a system and method for providing more security for configuring network devices.

A system and method in accordance with the present disclosure provides a more secure way to configure network devices.

In accordance with the present disclosure, the goal is to overcome the vulnerability of the client device and gateway device. Aspects of the present disclosure use a mechanism that triggers multifactor authentication (MFA) that includes an OTP for the current user to authenticate via the client device. This MFA would be enabled at all vulnerable points of the network including associated client devices and smart media devices.

The MFA may be performed via the client device and may also be included in the external server. The MFA is implemented to control any critical parameters from the client device so that before any changes are applied from the client device. In an example embodiment, a request to change a critical parameter of the network will trigger a request to generate an OTP and send it to an email, SMS, or app notification based on MFA configuration in the external server. The primary user may then authorize the requested change in critical parameters by responding with the OTP.

Similarly, when a smart media device receives a request from the user, the smart media device will communicate to the external server, which will trigger the external server as a request to generate an OTP. The smart media device then waits for the primary account holder to authenticate the request using the OTP before the changes get applied to the gateway device. Similarly, if there is any change requested in the external server, regarding a particular account setting, the external server will trigger the MFA security feature.

For an example use case, the primary account holder, or any authorized person on the account, may create a parental control profile and add client devices to that parental control profile. The approved client devices may set time-rules and enable device blocking. They may also set device priority, subnet change, or make static IP assignments, etc.

Now consider a situation where another user, henceforth known as secondary user, somehow gets hold of the primary client device. The secondary user intends to change the critical settings, or issue voice commands to the smart media device for critical information. In accordance with aspects of the present disclosure, the primary client device, or smart media device, sends information to the external server. The external server determines whether the parameter that client device is intending to change is a predetermined critical parameter of the network. If so, the external server will generate an OTP, and send the OTP to the primary account holder. The OTP may be sent as a notification, email, SMS, or any other form as per account settings, in the external server.

The primary account holder inputs the OTP in the primary client device, which will be sent back to the external server. The external server verifies the OTP, and on successful matching, the required information will be sent to the user or the requested setting changes will be sent to the gateway device. However, if the OTP entered by the primary user does not match, then the settings will not take place in the gateway device or in the account in the external server of the primary account holder.

Some advantages of aspects of the present disclosure include having strict control over parental controls. Additionally, guest networks cannot be created unless the primary account holder verifies the network through the security mechanism. Further, only the device which is authorized by the primary account holder will get a better quality of service. First, the onboarding of the gateway device has to be completed by the user. Only after onboarding can features such as parental controls, guest SSID creation, device priority setting, etc., may be used. In this case, the primary client device is used for initial configuration of parental control which may include creating profiles and adding devices to profiles. The client device may also set priority for each device, control guest SSID creation, and use smart media devices for easier interaction with the gateway device.

An example system and method for providing more security for configuring network devices in accordance with aspects of the present disclosure will now be described in greater detail with reference to FIGS. 2A-4.

Figure 2A:
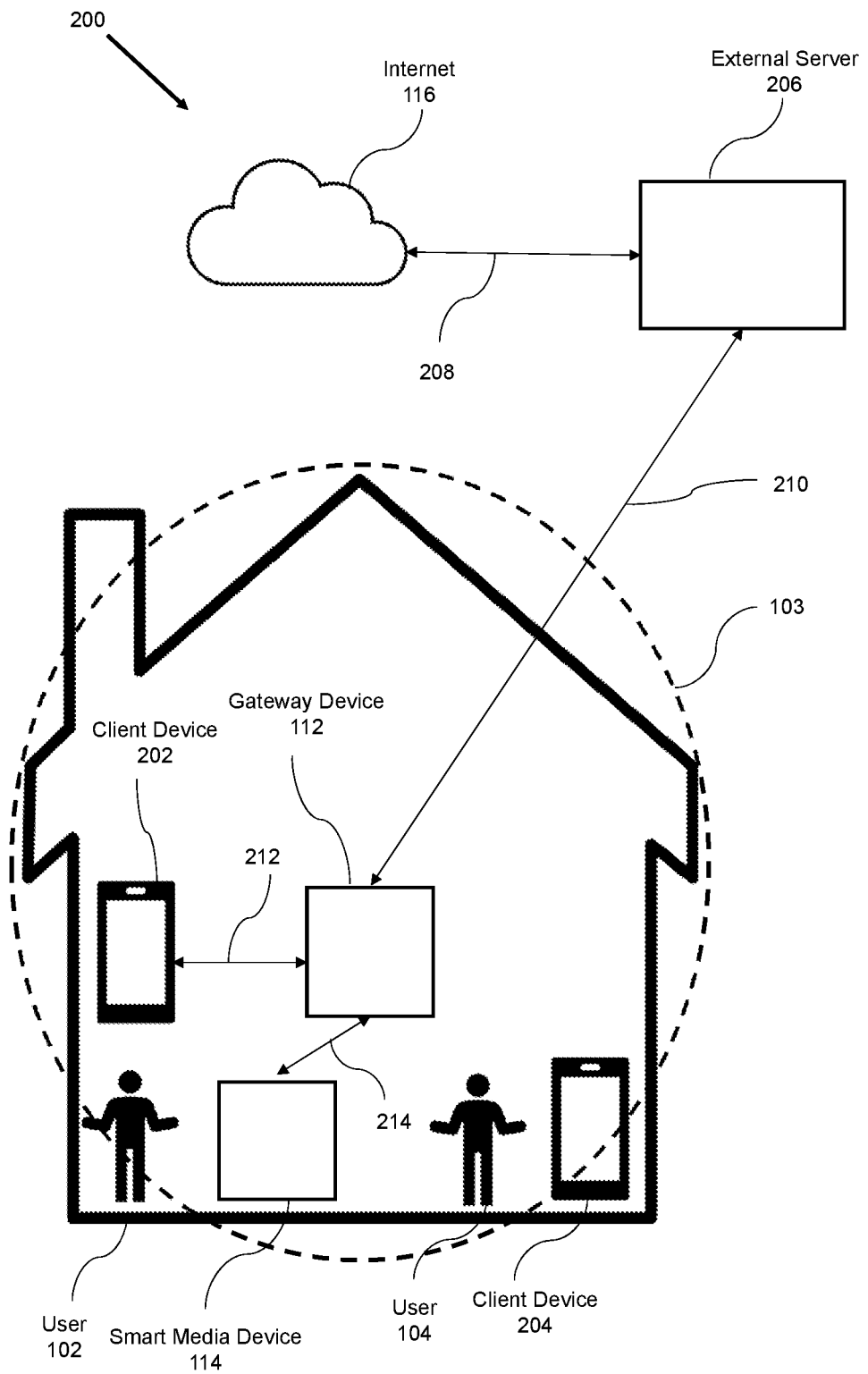
FIG. 2A illustrates a communication system onboarding a gateway device at time $t_1$, in accordance with aspects of the present disclosure.

FIG. 2A illustrates a communication system 200 onboarding a gateway device at time in accordance with aspects of the present disclosure.

As shown in the figure, communication system 200 includes user 102, wireless network 103, user 104, smart media device 114, internet 116, a client device 202, a client device 204, an external server 206, a communication channel 208, a communication channel 210, a communication channel 212, and a communication channel 214.

As shown in the figure, client device 202 is able to communicate with gateway device 112 via communication channel 212. Client device 202 is able to communicate with external server 206 through gateway device 112 via communication channel 210. Client device 202 is able to communicate with internet 116 through external server 206 via communication channel 208. Smart media device 114 is configured to communicate with gateway device 112 via communication channel 214. Smart media device 114 is able to communicate with external server 206 through gateway device 112 via communication channel 210. Smart media device is able to communicate with internet 116 through external server 206 via communication channel 208.

Figure 2B:
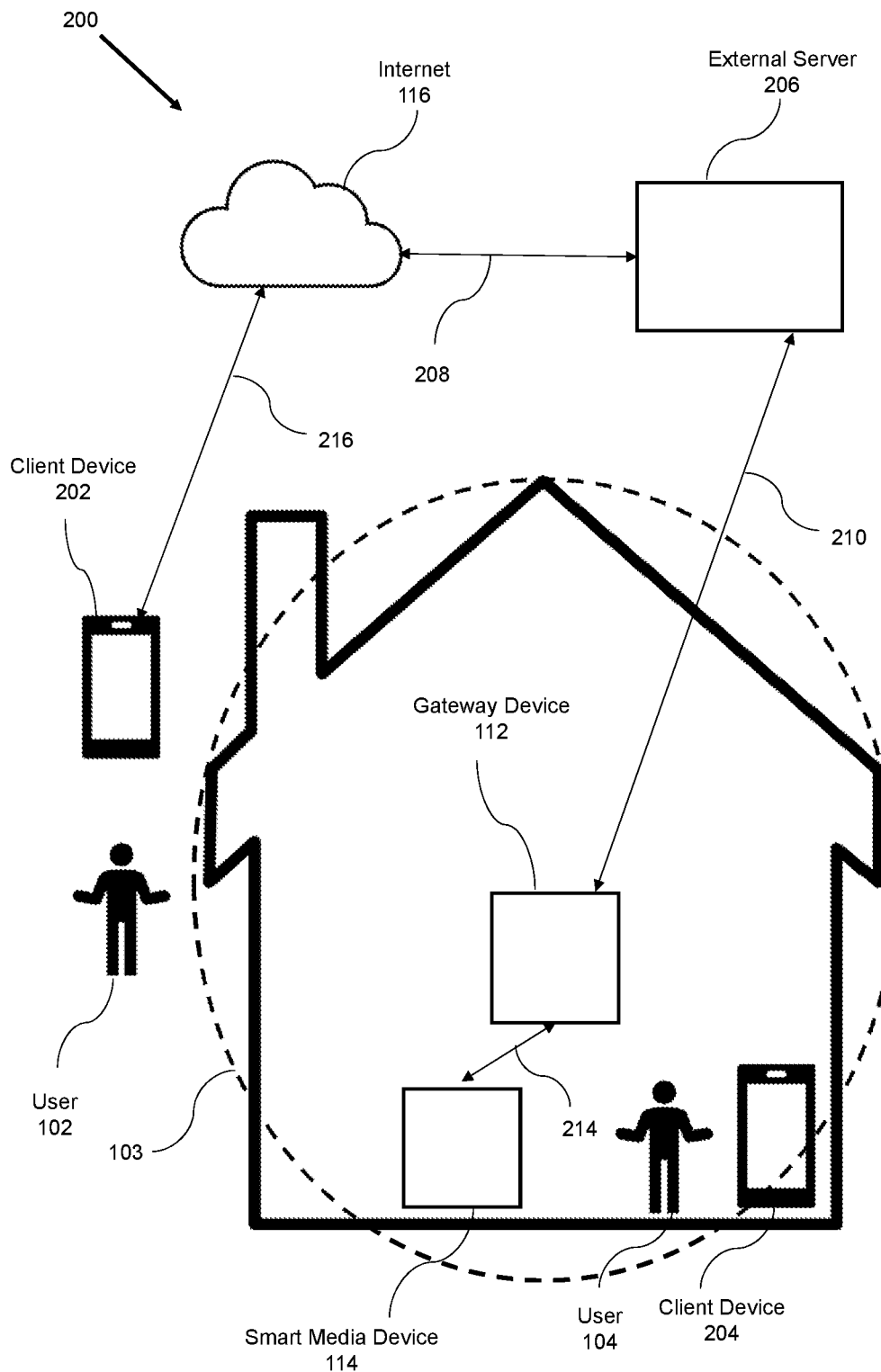
FIG. 2B illustrates a communication system onboarding a gateway device at time $t_2$.

FIG. 2B illustrates a communication system 200 onboarding a gateway device at time $t_2$.

FIG. 2B, at time $t_2$, is similar to FIG. 2A with the exception that user 102 has left the residence. Additionally, client device 202 is configured to communicate with internet 116 via wireless communication channel 216, which may include a cellular network (not shown).

Figure 3:
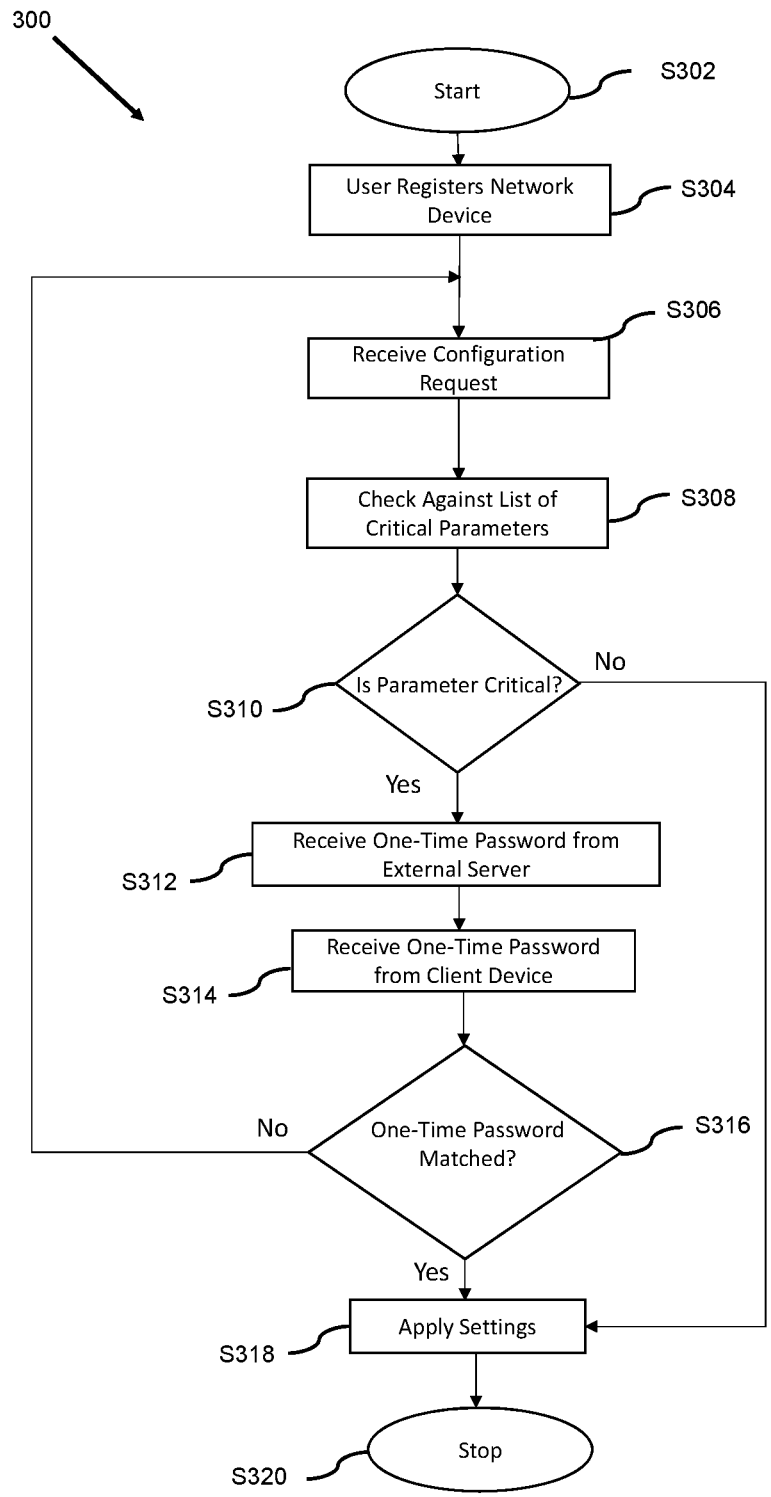
FIG. 3 illustrates an algorithm to be executed by a processor for onboarding a gateway device in accordance with aspects of the present disclosure.

FIG. 3 illustrates an algorithm 300 to be executed by a processor for network configuration of a gateway device in accordance with aspects of the present disclosure.

As shown in the figure, algorithm 300 starts (S302), and the user registers a network device (S304). For example, with reference to FIG. 2A, client device 202 may be registered as the primary client device in a data structure of a memory of external server 206. This will be described in greater detail with reference to FIGS. 4-5.

Figure 4:
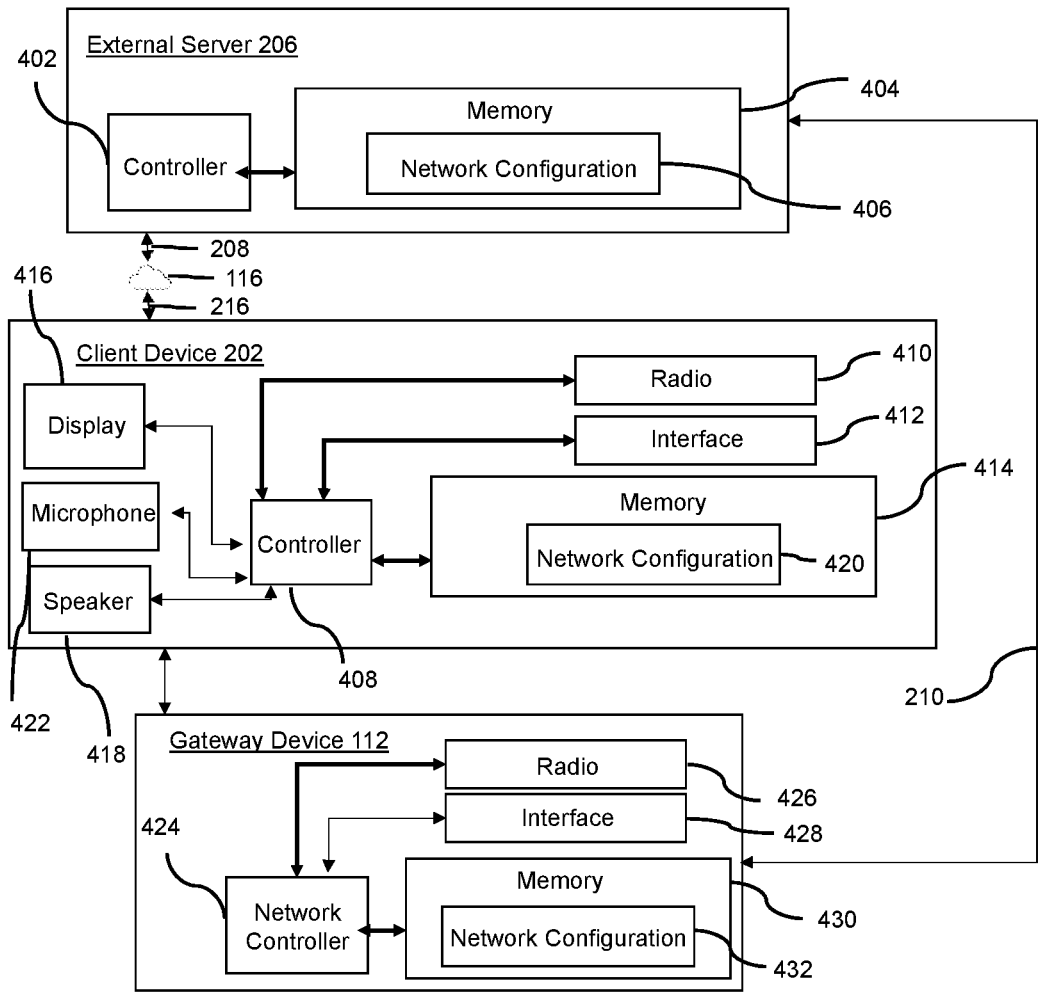
FIG. 4 illustrates an exploded view of client device 202, external server 206, and gateway device 112 as shown in FIG. 2.

FIG. 4 illustrates an exploded view of client device 202, external server 206, and gateway device 112 as shown in FIG. 2.

As shown in the figure, gateway device 112 includes: a network controller 424, a memory 430, which has stored therein an network configuration 432; at least one radio, a sample of which is illustrated as a radio 426, and an interface circuit 428.

In this example, network controller 424, memory 430, radio 426, and interface circuit 428 are illustrated as individual devices. However, in some cases, at least two of network controller 424, memory 430, radio 426 and interface circuit 428 may be combined as a unitary device. Whether as individual devices or as combined devices, network controller 424, memory 430, radio 426, and interface circuit 428 may be implemented as any combination of an apparatus, a system and an integrated circuit. Further, in some cases, at least one of network controller 424, memory 430, and interface circuit 428 may be implemented as a computer having a non-transitory computer-readable recording medium. A non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules maybe located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Network controller 424 can include a dedicated control circuit, CPU, microprocessor, etc. Network controller 424 controls the circuits of gateway device 112. Memory 430 can store various programming, and user content, and data including network configuration 432. Network configuration 432 includes instructions, that when executed by network controller 424 enables gateway device 112 to enable client device 202 to onboard onto gateway device 112.

Interface circuit 428 can include one or more connectors, such as RF connectors, or Ethernet connectors, and/or wireless communication circuitry, such as 5G circuitry and one or more antennas. Interface circuit 428 receives content from external server 206 (as shown in FIG. 2A) by known methods, non-limiting examples of which include terrestrial antenna, satellite dish, wired cable, DSL, optical fibers, or 5G as discussed above. Through interface circuit 428, gateway device 112 receives an input signal, including data and/or audio/video content, from external server 206 and can send data to external server 206.

Radio 426 (and preferably two or more radios), may also be referred to as a wireless communication circuit, such as a Wi-Fi WLAN interface radio transceiver and is operable to communicate with client device 202 and with external server 206. Radio 426 includes one or more antennas and communicates wirelessly via one or more of the 2.4 GHz band, the 5 GHz band, 6 GHz band, and the 60 GHz band, or at the appropriate band and bandwidth to implement the Wi-Fi 4, 5, 6, or 6E protocols. Gateway device 112 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, Zigbee protocol, and/or IEEE802.15.4 protocol, which also communicates in the ISM band.

External server 206 includes: a controller 402, and a memory 404, which has stored therein an network configuration 406.

Controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of external server 306 in accordance with the embodiments described in the present disclosure.

Memory 404 can store various programming, and user content, and data including network configuration 406. Network configuration 406 includes instructions, that when executed by controller 402 enables client device 202 to initiate onboarding onto gateway device 112.

Client device 202 includes: a controller 408; a memory 414, which has stored therein an network configuration 420; and at least one radio, a sample of which is illustrated as a radio 410; an interface circuit 412, a display 416, microphone 422, and a speaker 418.

In this example, controller 408, memory 414, radio 410, interface circuit 412, display 416, and speaker 418 are illustrated as individual devices. However, in some cases, at least two of controller 408, memory 414, radio 410, interface circuit 412, display 416, and speaker 418 may be combined as a unitary device. Further, in some cases, at least one of controller 408 and memory 414 may be implemented as a computer having tangible computer-readable media for carrying or having computer-executable instructions or data structures stored thereon.

As will be described in greater detail below, controller 408 is configured to execute instructions stored in memory 414 to cause client device 202 to receive a request to configure a configurable parameter of wireless network 103 (refer to FIG. 2A) and determine whether the configurable parameter of wireless network 103 matches a configurable parameter of wireless network 103 within the list of configurable critical parameters of wireless network 103. Client device 202 will also transmit, when the configurable parameter of wireless network 103 matches a configurable parameter of wireless network 103 within the list of configurable critical parameters of wireless network 103, the request for the OTP. Client device 202 additionally receives the notification of the OTP from external server 206, accesses the OTP based on the notification, and transmits the OTP to network controller 424.

Controller 408, which can include a dedicated control circuit, CPU, microprocessor, etc., controls the circuits of client device 202.

Memory 414 can store various programming, and user content, and data including network configuration 420. Network configuration 420 includes instructions, that when executed by controller 408 enables client device 202 to initiate onboarding onto gateway device 112.

Interface circuit 412 can include one or more connectors, such as RF connectors, or Ethernet connectors, and/or wireless communication circuitry, such as 5G circuitry and one or more antennas. Interface circuit 412 enables a user (not shown) to interface with controller 408 to manually operate or configure client device 202. Interface circuit 412 further enables controller 408 to decode communication signals received by radio 410 from gateway device 112 and to encode communication signals to be transmitted by radio 410 to gateway device 112.

Radio 410, may include a Wi-Fi WLAN interface radio transceiver that is operable to communicate with gateway device 112, as shown in FIG. 2 and also may include a cellular transceiver operable to communicate with a cellular service provider (not shown) through a cellular network. Radio 410 includes one or more antennas and communicates wirelessly via one or more of the 2.4 GHz band, the 5 GHz band, 6 GHz band, and the 60 GHz band, or at the appropriate band and bandwidth to implement the Wi-Fi 4, 5, 6, or 6E protocols. Client device 202 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, Zigbee protocol, and/or IEEE802.15.4 protocol, which also communicates in the ISM band.

Insofar as gateway device 112 provides connection to external server 206, such as a multiple systems operator (MSO), gateway device 112 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 2A as gateway device 112 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

In the non-limiting example discussed above, the gateway device is described as being configured to communicate through the internet by way of the service provider server with the external server. However, it should be noted that in some cases, the service provider server may include the external server in accordance with aspects of the present disclosure.

FIG. 5 illustrates a non-limiting example for a lookup table (LUT) 500 at a time $t_3$, in accordance with aspects of the present disclosure.

As shown in the figure, LUT 500 includes a gateway device column 502, a primary client device column 504, a critical parameters column 506, a contact information column 508, a row 510, a row 512, a row 514, a row 516, a row 518, a row 520, a row 522, and a row 524.

In an example embodiment, LUT 500 is stored in memory 404, as shown in FIG. 4, of external server 206. Client device 202, as shown in FIG. 2A, which may be known as "User 1", as shown in column 504 row 510, may be registered in external server 206 as the primary client device.

The critical parameters for Gateway A may be provided by the user of the primary client device User 1 by way of primary client device User 1, when the user registers Gateway A with external server 206. Similarly, the contact information as shown in contact information column 508 may be provided by the user of the primary client device User 1 by way of primary client device User 1, when the user registers Gateway A with external server 206.

Similarly, the critical parameters for Gateway B may be provided by the user of the primary client device User 2 by way of primary client device User 2, when the user registers Gateway B with external server 206. Similarly, the contact information as shown in contact information column 508 may be provided by the user of the primary client device User 2 by way of primary client device User 2, when the user registers Gateway A with external server 206.

As will be discussed in greater detail below, if a client device attempts to change a parameter of Gateway A, and that parameter is one of "Changing Parental Controls," modifying the "Guest SSID Password," or "Rebooting Gateway Device," then a OTP will be needed to enable such a change to the critical parameter. The OTP may be provided to the primary client device, which in this instance for Gateway A is User 1, by an email to "user1@email.com," by a phone call to "(xxx) xxx-xxxx," or by an email to "user1backup@email.com." On the other hand, if the parameter that is being requested to be changed is not one of the critical parameters listed in critical parameters column 506 for Gateway A, then the client device will be able to change the parameter.

Similarly, the critical parameters for Gateway B may be provided by the user of the primary client device User 2 by way of primary client device User 2, when the user registers Gateway B with external server 206. Similarly, the contact information as shown in contact information column 508 may be provided by the user of the primary client device User 2 by way of primary client device User 2, when the user registers Gateway B with external server 206.

Similarly, the critical parameters for Gateway C may be provided by the user of the primary client device User 3 by way of primary client device User 3, when the user registers Gateway C with external server 206. Similarly, the contact information as shown in contact information column 508 may be provided by the user of the primary client device User 3 by way of primary client device User 3, when the user registers Gateway C with external server 206.

Returning to FIG. 3, after the user registers a network device (S304), a configuration request is received (S306). For example, with reference to FIG. 2A, this configuration request may include a request from client device 202, a request from smart media device 114, or a change to settings of external server 206.

In an example embodiment, with reference to FIG. 5, a configuration request may be received from client device 202, as shown in FIG. 2A, which may be known as User 1, as shown in column 504 row 510 in LUT 500.

In some embodiments, with reference to FIG. 2B, the configuration request may occur outside of wireless network 103. In this situation, client device 202 may send a request via internet 116 using a wireless communication channel 216, to communicate with external server 206 via communication channel 208.

Returning to FIG. 3, after a configuration request is received (S306), a check against the list of critical parameters is conducted (S308). For example, as mentioned previously, some critical parameters may include a guest SSID password, parental control settings, etc.

Returning to FIG. 3, a check against the list of critical parameters is conducted (S308), it is determined if the parameter is critical (S310). For example, as shown in FIG. 5, if a configuration request of User 1 is one of the critical parameters shown in column 506 including: changing parental controls, requesting a guest SSID password, or rebooting the gateway device, then the parameter is determined to be critical.

Returning to FIG. 3, if it is determined that a parameter is not critical (No at S310), then settings are applied (S318). For example, with reference to FIG. 2A, if user 104, the child of user 102, is attempting to change the name of the gateway device. User 104 would be able to do so using client device 204.

Returning to FIG. 3, if it is determined that a parameter is critical (Yes at S310), then an OTP from external server is received (S312). For example, with reference to FIG. 5, if the configuration request of User 1 is concerned with changing parental controls, which is shown as a critical parameter in column 506 row 510 of LUT 500, then an OTP from external server 206 will be sent to user1@email.com as shown in column 508 row 510 of LUT 500

Returning to FIG. 3, after an OTP from the external server is received (S312), then an OTP from the client device is received (S314). For example, with reference to the situation above, an OTP is received from external server 206 and then a password is received from the email of the primary account holder, in this example user1@email.com.

Returning to FIG. 3, after an OTP from the client device is received (S314), it is determined if the OTP is matched (S316). For example, with the situation mentioned previously, the OTP may be sent to the primary user's email, SMS, or an app notification based on the chosen configuration made during account setup in external server 206.

In some embodiments, with reference to FIG. 2A, gateway device 112 may determine if the OTP sent from client device 202 and the OTP sent from external server 206 match. For example, in some embodiments, as shown in FIG. 4, network controller 424 may compare the OTP sent from client device 202 and the OTP sent from external server 206 to determine if there is a match.

Returning to FIG. 3, if it is determined the OTP was matched (Yes at S316), then settings are applied (S318). For example, with reference to FIG. 5, if user 1 is making an attempt to change a parental control using client device 202. They will receive an OTP to their email, for example user1@email.com, and will be prompted to match that OTP with the one received from external server 206. When matched, the change in parental controls will be applied.

Returning to FIG. 3, if it is determined the OTP does not match (No at S316), then the request for configuration is denied and algorithm 300 waits for a new request for configuration (return to S306). Again, this request configuration may be a client device request, a smart media device command, or an external server settings change.

Returning to FIG. 3, after settings are applied (S318), algorithm 300 stops (S320).

In a conventional system and method for configuring network devices, a gateway device and client device are used to manage the home network. After onboarding the gateway device, the user can configure it to support a guest network, create and enable parental control profiles, and effectively control devices that are connected to the home network. The client device is the single control center for managing all functionality of the gateway device including onboarding, parental control, guest SSID, etc. All of the control and management is done by using only one level of authentication of users. The one level of authentication of users poses a threat to security in certain vulnerable network endpoints that have critical parameters. One major concern is that the client device is the main point of interaction with the gateway device for the end user and has all the controlling features included. Some of these controlling features may be overseeing sensitive information that is vulnerable to either inadvertent changes or maliciously intended changes. Some changes include: editing time rules related to a profile in parental controls, subnet/DHCP range change, static IP assigned to some devices, and device priority within the home network. The client device does support the control of some features through a smart media device such as: enabling or disabling a guest SSID, spell out a guest SSID password, reboot the gateway device, and a malicious user may use voice commands to obtain details of the guest password which is a security concern. There are controls available within the external server as well. It is possible that the user may inadvertently change some settings in the external server that could affect the home network and device management. If the credentials for the external server are divulged then it is possible that maliciously intended changes could be made. In some cases, the service provider may make changes to the user account and the user may want to be informed of the changes. This shows the need for an extra level of security for the critical parameters supported in the gateway device. For example, security could be increased around the usage of controlling parental control rules, device priority assignments, subnet changes, and smart media device commands.

In accordance with the present disclosure, the goal is to overcome the vulnerability of the client device and gateway device. Aspects of the present disclosure use an OTP trigger mechanism and multifactor authentication (MFA) that may include at least authentication by the user in the client device. In order to overcome the security vulnerabilities, aspects of the present disclosure include a security feature based in the external server using an OTP. This security feature would be implemented to monitor all vulnerable points within the network, non-limiting examples of which include the client device and the smart media device.

The OTP may be used to control any critical parameters of a network device, so that before any changes to the network are applied from the client device, a request will be triggered for the external server to generate an OTP and send it to the user associated with the client device. The OTP may be sent via an email, SMS, or application notification based on a preset configuration in the external server. The external server then waits for the primary user to authorize the requested change in critical parameters.

Similarly, when a smart media device receives a request from the user, the smart media device will communicate to the external server, which triggers a request to generate an OTP. The smart media device then subsequently waits for the primary account holder to authenticate the request using the OTP before the changes get applied to the gateway device. Similarly, if there is any change requested in the external server, regarding a particular account setting, the external server will trigger the OTP security feature.

One advantage is that the external server will only allow the gateway to apply settings to critical parameters of a network after authorization by the primary account holder. This oversees any modification to already existing parental control rules as well as creating new rules. Additionally, the external server will oversee quality of service and critical network settings. Another advantage is that the smart media device will not comply with a user's request, unless the request is authorized by the primary account holder using the OTP. An additional advantage is that any critical change in the user's account in the external server will also need to be authorized by the primary account holder. The OTP will ensure no change takes place in the account, without the primary account holder authorizing that change.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with a network controller and an external server, the network controller being configured to manage a wireless network, to change a critical parameter of the wireless network, to transmit a request for a one time password, the external server being configured to generate the one time password in response to the request for the one time password, to provide a notification of the one time password and to transmit the one time password to the network controller, the network controller being configured to additionally receive the one time password from the external server, said client device comprising:

a memory having a data structure stored therein, the data structure including a list of configurable critical parameters of the wireless network; and a processor configured to execute instructions stored on said memory to cause said client device to:

receive a request to configure a configurable parameter of the wireless network;

determine whether the configurable parameter of the wireless network matches a configurable critical parameter of the wireless network within the list of configurable critical parameters of the wireless network;

transmit, when the configurable parameter of the wireless network matches a configurable critical parameter of the wireless network within the list of configurable critical parameters of the wireless network, the request for the one time password;

receive the notification of the one time password from the external server;

access the one time password based on the notification; and transmit the one time password to one of the network controller and to the external server.

2. A method of using a client device with a network controller and an external server, the network controller being configured to manage a wireless network, to change a critical parameter of the wireless network, to transmit a request for a one time password, the external server being configured to generate the one time password in response to the request for the one time password, to provide a notification of the one time password and to transmit the one time password to the network controller, the network controller being configured to additionally receive the one time password from the external server, said method comprising:

storing, into a memory, a data structure including a list of configurable critical parameters of the wireless network;

receiving, via a processor configured to execute instructions stored on the memory, a request to configure a configurable parameter of the wireless network;

determining, via the processor, whether the configurable parameter of the wireless network matches a configurable critical parameter of the wireless network within the list of configurable critical parameters of the wireless network;

transmitting, via the processor and when the configurable parameter of the wireless network matches a configurable critical parameter of the wireless network within the list of configurable critical parameters of the wireless network, the request for the one time password;

receiving, via the processor, the notification of the one time password from the external server;

accessing, via the processor, the one time password based on the notification; and transmitting, via the processor, the one time password to one of the network controller and to the external server.

3. A non-transitory, computer-readable media having computer-readable instructions stored thereon, the computer-readable instructions being capable of being read by a client device for use with a network controller and an external server, the network controller being configured to manage a wireless network, to change a critical parameter of the wireless network, to transmit a request for a one time password, the external server being configured to generate the one time password in response to the request for the one time password, to provide a notification of the one time password and to transmit the one time password to the network controller, the network controller being configured to additionally receive the one time password from the external server, wherein the computer-readable instructions are capable of instructing the client device to perform the method comprising:

storing, into a memory, a data structure including a list of configurable critical parameters of the wireless network;

receiving, via a processor configured to execute instructions stored on the memory, a request to configure a configurable parameter of the wireless network;

determining, via the processor, whether the configurable parameter of the wireless network matches a configurable critical parameter of the wireless network within the list of configurable critical parameters of the wireless network;

transmitting, via the processor and when the configurable parameter of the wireless network matches a configurable critical parameter of the wireless network within the list of configurable critical parameters of the wireless network, the request for the one time password;

receiving, via the processor, the notification of the one time password from the external server;

accessing, via the processor, the one time password based on the notification; and transmitting, via the processor, the one time password to one of the network controller and to the external server.

4. An external server for use with a first client device, a second client device, and a network controller, the network controller being configured to manage a wireless network, to change a critical parameter of the wireless network, said external server comprising:

a memory having a data structure stored therein, the data structure including a list of configurable critical parameters of the wireless network; and a processor configured to execute instructions stored on said memory to cause said external server to:

receive, from the second client device, a request to configure a configurable parameter of the wireless network;

determine whether the configurable parameter of the wireless network matches a configurable critical parameter of the wireless network within the list of configurable critical parameters of the wireless network;

transmit, when the configurable parameter of the wireless network matches a configurable critical parameter of the wireless network within the list of configurable critical parameters of the wireless network, a one time password to the first client device;

receive the one time password from the first client device; and configure the configurable parameter of the wireless network.

5. A method of using an external server with a first client device, a second client device, and a network controller, the network controller being configured to manage a wireless network, to change a critical parameter of the wireless network, said method comprising:

storing, into a memory, a data structure including a list of configurable critical parameters of the wireless network;

receiving, via a processor configured to execute instructions stored on the memory and from the second client device, a request to configure a configurable parameter of the wireless network;

determining, via the processor, whether the configurable parameter of the wireless network matches a configurable critical parameter of the wireless network within the list of configurable critical parameters of the wireless network;

transmitting, via the processor and when the configurable parameter of the wireless network matches a configurable critical parameter of the wireless network within the list of configurable critical parameters of the wireless network, a one time password to the first client device;

receiving, via the processor, the one time password from the first client device; and configuring, via the processor, the configurable parameter of the wireless network.

6. A non-transitory, computer-readable media having computer-readable instructions stored thereon, the computer-readable instructions being capable of being read by an external server for use with a first client device, a second client device, and a network controller, the network controller being configured to manage a wireless network, to change a critical parameter of the wireless network, wherein the computer-readable instructions are capable of instructing the external server to perform the method comprising:

storing, into a memory, a data structure including a list of configurable critical parameters of the wireless network;

receiving, via a processor configured to execute instructions stored on the memory and from the second client device, a request to configure a configurable parameter of the wireless network;

determining, via the processor, whether the configurable parameter of the wireless network matches a configurable critical parameter of the wireless network within the list of configurable critical parameters of the wireless network;

transmitting, via the processor and when the configurable parameter of the wireless network matches a configurable critical parameter of the wireless network within the list of configurable critical parameters of the wireless network, a one time password to the first client device;

receiving, via the processor, the one time password from the first client device; and configuring, via the processor, the configurable parameter of the wireless network.

7. A network controller for use with an external server, a first client device, and a second client device, the external server being configured to generate a one time password in response to a request for the one time password, to provide a notification of the one time password and to transmit the one time password to the network controller, said network controller comprising:

a memory having a data structure stored therein, the data structure including a list of configurable critical parameters of the wireless network; and a processor configured to execute instructions stored on said memory to cause said network controller to:

receive, from the second client device, a request to configure a configurable parameter of the wireless network;

determine whether the configurable parameter of the wireless network matches a configurable critical parameter of the wireless network within the list of configurable critical parameters of the wireless network;

transmit, when the configurable parameter of the wireless network matches a configurable critical parameter of the wireless network within the list of configurable critical parameters of the wireless network, the request for the one time password to the external server;

receive the one time password from the external server;

receive the one time password from the first client device;

transmit a verification to the external server.

8. A method of using a network controller with an external server, a first client device, and a second client device, the external server being configured to generate a one time password in response to a request for the one time password, to provide a notification of the one time password and to transmit the one time password to the network controller, said method comprising:

storing, into a memory, a data structure including a list of configurable critical parameters of the wireless network; and receiving, via a processor configured to execute instructions stored on the memory and from the second client device, a request to configure a configurable parameter of the wireless network;

determining, via the processor, whether the configurable parameter of the wireless network matches a configurable critical parameter of the wireless network within the list of configurable critical parameters of the wireless network;

transmitting, via the processor and when the configurable parameter of the wireless network matches a configurable critical parameter of the wireless network within the list of configurable critical parameters of the wireless network, the request for the one time password to the external server;

receiving, via the processor, the one time password from the external server;

receiving, via the processor, the one time password from the first client device;

transmitting, via the processor, a verification to the external server.

9. A non-transitory, computer-readable media having computer-readable instructions stored thereon, the computer-readable instructions being capable of being read by a network controller with an external server, a first client device, and a second client device, the external server being configured to generate a one time password in response to a request for the one time password, to provide a notification of the one time password and to transmit the one time password to the network controller, wherein the computer-readable instructions are capable of instructing the network controller to perform the method comprising:

storing, into a memory, a data structure including a list of configurable critical parameters of the wireless network;

receiving, via a processor configured to execute instructions stored on the memory and from the second client device, a request to configure a configurable parameter of the wireless network;

determining, via the processor, whether the configurable parameter of the wireless network matches a configurable critical parameter of the wireless network within the list of configurable critical parameters of the wireless network;

transmitting, via the processor and when the configurable parameter of the wireless network matches a configurable critical parameter of the wireless network within the list of configurable critical parameters of the wireless network, the request for the one time password to the external server;

receiving, via the processor, the one time password from the external server;

receiving, via the processor, the one time password from the first client device; and transmitting, via the processor, a verification to the external server.

* * * * *